(12) United States Patent
Petit et al.

(10) Patent No.: US 10,990,770 B2
(45) Date of Patent: Apr. 27, 2021

(54) PORTABLE OBJECT AND NFC ANTENNA THEREOF

(71) Applicant: ORANGE, Paris (FR)

(72) Inventors: Stephane Petit, Herouville Saint Clair (FR); Philippe Levionnais, Caen (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/088,290

(22) PCT Filed: Mar. 23, 2017

(86) PCT No.: PCT/FR2017/050679
§ 371 (c)(1),
(2) Date: Sep. 25, 2018

(87) PCT Pub. No.: WO2017/162988
PCT Pub. Date: Sep. 28, 2017

(65) Prior Publication Data
US 2019/0087613 A1    Mar. 21, 2019

(30) Foreign Application Priority Data
Mar. 25, 2016 (FR) ........................... 1652604

(51) Int. Cl.
*G06K 7/10* (2006.01)
*G06K 19/077* (2006.01)
(Continued)

(52) U.S. Cl.
CPC ... *G06K 7/10297* (2013.01); *G06K 19/07762* (2013.01); *H04B 5/0062* (2013.01);
(Continued)

(58) Field of Classification Search
CPC ............... G06K 19/07762; G06K 7/10297
(Continued)

(56) References Cited

U.S. PATENT DOCUMENTS

2007/0120687 A1    5/2007 Lerch et al.
2015/0136858 A1    5/2015 Finn et al.
(Continued)

FOREIGN PATENT DOCUMENTS

WO    2006039722 A2    4/2006

OTHER PUBLICATIONS

"Identification card—Contactless integrated circuit(s) cards—Proximity cards—Part 2: Radio frequency power and signal interface." ISO/IEC 14443-2, ISO/IEC JTC1/SC17/WG8, International Standard Organization, Mar. 26, 1999.
(Continued)

*Primary Examiner* — Toan C Ly
(74) *Attorney, Agent, or Firm* — David D. Brush; Westman, Champlin & Koehler, P.A.

(57) ABSTRACT

A portable object for near field communication with an external reader able to provide a magnetic field. The object has no internal power supply or energy storage. It includes a near field communication module having at least one antenna and a microcontroller for managing the near field communication; and a support member in the form of a bracelet for receiving the antenna. The object is designed such that the antenna extends substantially along the bracelet-shaped support member, so that, when the object is within the incident magnetic field, the antenna, which is wound over the length of the support member, is at least partly exposed to the field irrespective of the orientation of the object in space. Also provided is an an antenna for a portable object.

18 Claims, 2 Drawing Sheets

(51) Int. Cl.
*H01Q 1/27* (2006.01)
*H01Q 7/00* (2006.01)
*H04B 5/00* (2006.01)
*H01Q 1/22* (2006.01)

(52) U.S. Cl.
CPC ......... *H04B 5/0081* (2013.01); *H01Q 1/2216* (2013.01); *H01Q 1/273* (2013.01); *H01Q 7/00* (2013.01)

(58) Field of Classification Search
USPC .......................................................... 235/451
See application file for complete search history.

(56) References Cited

U.S. PATENT DOCUMENTS

2017/0222692 A1* 8/2017 Huang ................. H04B 5/0081
2018/0294844 A1* 10/2018 Choi ....................... G06F 3/017

OTHER PUBLICATIONS

International Search Report dated Jun. 2, 2017 for corresponding International Application No. PCT/FR2017/050679, filed Mar. 23, 2017.
English translation of the International Written Opinion dated Jun. 2, 2017 for corresponding International Application No. PCT/FR2017/050679, filed Mar. 23, 2017.
Finkenzeller et al., "Battery powered tags for ISO/IEC 14443, actively emulating load modulation", Apr. 13, 2011.

\* cited by examiner

PORTABLE OBJECT AND NFC ANTENNA THEREOF

CROSS-REFERENCE TO RELATED APPLICATIONS

This Application is a Section 371 National Stage Application of International Application No. PCT/FR2017/050679, filed Mar. 23, 2017, which is incorporated by reference in its entirety and published as WO 2017/162988 on Sep. 28, 2017, not in English.

TECHNICAL FIELD

The invention pertains generally to telecommunications, and more precisely to contactless communications using short-range radio technologies, especially of NFC (Near Field—NF Communications) type.

It applies more particularly to the antenna of portable objects equipped with physical and software resources including a near-field communication module of passive type, able to communicate with external reading terminals.

PRIOR ART

"NFC" communications, based mainly on ISO (International Standard Organization) standard 14443, use wireless technologies to allow information exchange between two peripherals a short distance apart, typically less than ten centimeters.

These contactless applications may relate, for example, to electronic transactions in the public transport sector, or else also identification applications, access control applications, etc. An NFC communication is established between two contactless entities, termed NFC entities, one operating as contactless card and the other operating as contactless card reader. Such an NFC entity is composed of a near-field communication device and of an associated antenna which allows it to set up a contactless communication with another NFC entity. The NFC entity which operates as contactless card may for example correspond to a radio tag, in English "Tag NFC". An NFC entity which operates as card reader may correspond for example to an electronic payment terminal or an item of equipment for validating electronic transport tickets, etc.

The functionalities of such a contactless entity may be provided by a complex device, for example a mobile telephone terminal, a computer, an electronic tablet, etc. However, these mobile terminals are expensive and bulky and are therefore reserved for a certain category of persons, excluding children in particular. It is desirable in this context to be able to benefit from very simple and very compact objects that are able to offer such capabilities. So as not to be mislaid by the user while remaining practical to use, such an object can advantageously take the form of an electronic bracelet or of any other portable object to be carried or worn on the body of a user.

Simple passive transponders may be used for this purpose. A passive transponder is devoid of electrical energy supply. Its range is however limited by the coupling factor which is established between the two antennas of the two contactless entities: the smaller the antenna of the transponder, this proving to be unavoidable in a portable object of bracelet type, the lower the range of the object, thereby rendering communication difficult and random.

Additionally, in such a device, the antenna may be poorly placed in the bracelet: if the wearer does not know where the antenna is, they may present their wrist to the reader in such a way that the antenna is too far from the antenna of the reader.

To address this problem, technologies based on active modulation (in English: "active load modulation") have been proposed. Such a system is described for example in the work "RFID-Handbuch—Grundlagen und praktische Anwendungen von Transpondern, kontaktlosen Chipkarten und NFC" by Klaus Finkenzeller (HASSER, 2015). They considerably increase the range of the NFC object for an identical antenna size, but they assume the introduction of an energy source associated with the NFC component.

There therefore exists a need for a simple and inexpensive portable object, such as for example a bracelet, devoid of a cell or of any energy source, but nonetheless effective in terms of near-field communication.

The invention seeks to improve the situation by aiming in a general manner to obtain an antenna circuit for such an object.

THE INVENTION

For this purpose, according to a hardware aspect, a subject of the invention is a portable object for near-field communication with an external reader able to provide a magnetic field, the object being devoid of internal electrical energy supply and of energy storage means, the object comprising:

a near-field communication module comprising at least one antenna and a microcontroller for managing near-field communication;

a bracelet-shaped support for receiving the antenna;

characterized in that the object is designed in such a way that the antenna extends substantially along the bracelet-shaped support, so that, when the object is in the incident magnetic field, the antenna, being wound along the support, is at least partially exposed to the field, whatever the orientation of the object in space.

Advantageously, the antenna according to the invention extends substantially along the support of the bracelet, allowing the incident magnetic field to penetrate the antenna and therefore to generate an induced current whatever the orientation of the worn or carried object when it is presented to the reader.

By "substantially" is meant that the antenna covers a significant part of the support, for example more than half. If the antenna extends thus substantially along the support, when the portable object is a bracelet worn on the wrist, the antenna winds around the wrist of the wearer at the same time as the bracelet, and therefore the presentation of said bracelet in front of the reader can be done in a relatively free manner, since the incident field penetrates the bracelet independently of its position in front of the reader: part of the antenna will receive the magnetic field lines, whatever the orientation of the wrist. It is therefore possible to position the wrist, and therefore the bracelet, very freely in space, while remaining in the range of the magnetic field, so as to establish communication with the reader. On the contrary, the use of an NFC tag according to the state of the art makes it obligatory to choose a favored location of the bracelet (on top for example, in the same way as is usually done for a watch dial) in order to insert the tag, the antenna of which is often substantially square. In this case the user must "aim at" the reader with their bracelet in such a way that the two antennas are positioned in proximity to one another and face-to-face. If the wearer presents the antenna parallel to the field of the reader, the incident magnetic field is not received correctly and communication cannot be established. If the wearer presents the underneath or the side of their wrist to the reader (whilst the antenna is situated on top), the incident magnetic field is not received correctly and communication cannot be established. This presents a major drawback when the wearer does not know the position of the antenna, or does not succeed in positioning the bracelet correctly (for example because they are wearing or carrying another object). Winding the antenna around the support, and therefore the wrist of the user, therefore greatly facilitates the use of the object.

By "bracelet" is meant any object capable of winding around a part of a user's body (wrist, ankle, finger, etc.)

According to a particular mode of implementation of the invention, a portable object such as described hereinabove is furthermore characterized in that the antenna is formed of a plurality of turns defining a longitudinal central axis, comprising a total length of said antenna along its longitudinal axis and a width perpendicularly to its longitudinal axis, characterized in that the length, the width, the number and the dimensions of the turns are calculated so as to constrain the electrical resistance formed by the antenna.

By "constrain" is meant here to best limit the resistance so as to address the constraints of the application. Advantageously, an antenna formed of several turns improves the mutual inductance between the antennas and therefore allows better communication between the reader and the receiver.

The inventors have experimentally optimized the number of turns and concluded that a good compromise is between three and five turns. Indeed, too significant an increase in the number of turns causes, as is well known to the person skilled in the art, the resistance of the antenna to increase.

Hence, as will be detailed hereinafter, the dimensions of the antenna and the characteristics of the turns can be calculated in such a way as to minimize the resistance, therefore the bandwidth of the antenna, and therefore the power consumed or emitted by the antenna. This is particularly advantageous in the context envisaged, where the object is devoid of internal energy supply: the power required for correct communication with the reader is ensured with no internal energy supply of the portable object.

The relations between the dimensions of the antenna, the number of turns, their characteristics and its resistance are well known to the person skilled in the art and will be described hereinafter.

According to a variant of this particular mode of implementation of the invention, a portable object such as described hereinabove is furthermore characterized in that the length of the antenna is at least equal to half that of the support.

Advantageously according to this mode, the antenna extends over at least half the support and therefore winds over more than half the circumference of the user's wrist. In this way, the wearer can present their wrist to the reader in numerous orientations (on top, underneath, side-on, etc.)

According to another variant of this particular mode of implementation of the invention, a portable object such as described hereinabove is furthermore characterized in that the length of the antenna is substantially equal to the length of the support.

Advantageously according to this mode, the antenna extends over a major part of the support and therefore winds almost entirely around the user's wrist. In this way the wearer can present their wrist to the reader in any orientation (on top, underneath, side-on, etc.).

According to another variant of this particular mode of implementation of the invention, a portable object such as described hereinabove is furthermore characterized in that the length of the antenna is greater than the length of the support.

Advantageously according to this mode, the antenna is longer than the support and can therefore wind several times around the user's wrist. This further improves the effectiveness of the reception of the magnetic field, in particular when the bracelet is small, for example if it is a bracelet to be wound around a finger of the user (a ring) and not around their wrist.

According to yet another variant of this particular mode of implementation of the invention, which will be able to be implemented alternatively or cumulatively with the previous ones, a portable object such as described hereinabove is furthermore characterized in that the width of the antenna is chosen substantially equal to the width of the support.

Advantageously according to this mode, the antenna uses the whole of the available support of the bracelet, thereby maximizing the capabilities for communication with the reader.

According to another variant of this particular mode of implementation of the invention, which will be able to be implemented alternatively or cumulatively with the previous ones, a portable object such as described hereinabove is furthermore characterized in that the width of the turns is equal to the inter-turn distance.

Advantageously according to this variant, the power consumed by the antenna is reduced, this being particularly beneficial in the context of an antenna which is not energized.

According to another variant of this particular mode of implementation of the invention, which will be able to be implemented alternatively or cumulatively with the previous ones, a portable object such as described hereinabove is furthermore characterized in that the antenna comprises:
three turns
a width of turns of 0.5 mm
an inter-turn width of 0.5 mm
a length of 10 cm
a width of 1 cm Advantageously, the inventors have noted that such an arrangement rendered the portable object particularly effective for the sought-after context.

According to another particular mode of implementation of the invention, which will be able to be implemented alternatively or cumulatively with the previous one, a portable object such as described hereinabove is furthermore characterized in that the antenna is fixed to the support in a removable manner.

Advantageously according to this mode, the antenna can be fixed on various supports and/or types of supports and moved from one support to the other.

According to another particular mode of implementation of the invention, which will be able to be implemented alternatively or cumulatively with the first, a portable object such as described hereinabove is furthermore characterized in that the antenna is fixed to the support in a permanent manner.

Advantageously according to this mode, the antenna can be fixed in a permanent manner, for example glued or molded, in such a way as to increase the solidity of the bond between the antenna and the support, as well as to decrease the retail cost of the object.

According to another particular mode of implementation of the invention, which will be able to be implemented alternatively or cumulatively with the previous ones, the antenna comprises a so-called "interior" face facing the wrist when the object is carried or worn, the object being characterized in that the antenna is overlaid with plastoferrite on said interior face.

Advantageously according to this mode, when the antenna is carried or worn, it isolates the carrier's or wearer's wrist from the electromagnetic radiations emitted by the reader and by the antenna of the portable object. Subsidiarily, it can also isolate the antenna itself from interference.

According to another hardware aspect, the invention pertains to an antenna such as described in one of the preceding claims.

The invention will be better understood on reading the description which follows, given by way of example and with reference to the appended drawings.

THE FIGURES

DETAILED DESCRIPTION OF AN EXEMPLARY EMBODIMENT ILLUSTRATING THE INVENTION

Figure 1:
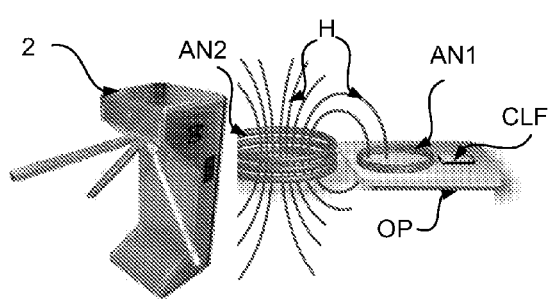
FIG. 1 represents the general context of use of a portable object submerged in an electromagnetic field, able to provide NFC services to its wearer.

FIG. 1 represents the general context of use of a device, or portable object (OP), able to provide NFC services to its wearer (not represented), according to the state of the art. Such an NFC service is for example a transport pass purchase and consumption service, materialized by the reader, or station (2). Once the applications and data required for the proper operation of the service have been loaded into the portable device, it behaves as a contactless chip card.

The object, or portable device (OP) comprises at the minimum:
near-field communication means of NFC type, including conventionally:
an NFC antenna (AN1);
an NFC component, called CLF (ContactLess Frontend), capable of ensuring near-field communications of NFC type, with an external reader, according to this example a reader (station) for validating tickets (2);
a support, materialized here by a magnetic card support on which are fixed (placed, glued, etc.) the antenna and the microcontroller.

As it is well known to the person skilled in the art, the NFC antenna (AN1) of the object operates in interaction with the antenna (AN2) of the reader. This interaction takes the form of a magnetic coupling which allows exchange of energy between the two antennas. It relies on the magnetic field (H) generated by the current which flows in the first antenna. The intensity of the magnetic field H is measured in Amperes per meter (A/m). The antenna generally consists of several turns constituting a coiling. The magnetic field H generated by the reader is directed in a sense which depends on the sense of the current in the coil of the antenna. The direction of the magnetic field generated is orthogonal to the plane of the turns of the first antenna. According to the diagram, it is also perpendicular to the plane of the turns of the second antenna (the antenna of the portable object) such as presented to the reader. It conventionally generates an induced electric current in the NFC component of the portable object.

The antenna according to this example is devoid of energy supply internal to the portable object. Communication can be ensured by the induced electric current alone.

The main difficulty for a portable device such as this, when its antenna is of small size and unenergized, is to nonetheless offer good radio effectiveness so as to be capable of emitting or receiving a signal with correct power.

Generally, the signal power delivered by the NFC antenna is directly proportional to the width of its bandwidth. It is recalled that the bandwidth of an antenna corresponds to the frequency band where the energy transfer from the antenna to the receiver (or vice versa) is maximum.

For a constant induced field H, it may be shown that the power P emitted or received by the antenna can be modeled in the form:

$$P = k * \Delta\omega \quad (1)$$

where k is a constant, and $\Delta\omega$ is the bandwidth that one wishes to obtain.

For a given field H, the power therefore depends directly on the bandwidth ($\Delta\omega$) of the antenna. If the bandwidth is large, the power to be emitted for sufficient signal quality may become very high. Stated otherwise, the larger the bandwidth, the higher the power to be generated must be. In the case where the circuit associated with the antenna can be energized, this is not very significant since this energy supply can alleviate the deficiencies of the antenna by providing it with additional power. If the device is devoid of energy supply, on the other hand, it becomes problematic to generate such power.

In the context which interests us, that is to say in the absence of energy supply, it is therefore important that the bandwidth of the antenna remains low. However, it is well known that the bandwidth of an antenna is proportional to its intrinsic resistance (optionally summed with a resistance added in series with its coiling). The bandwidth is in fact expressed conventionally in the form:

$$\Delta\omega/w_0 = 1/Q = R/Lw_0 \quad (2)$$

where:
R is the resistance of the antenna,
L its inductance,
W0 the resonant frequency of the circuit, and
Q is the quality factor of the antenna.

An objective in this context is therefore to reduce the resistance of the antenna.

It is naturally possible to reduce, or indeed to cancel the resistance placed in series with the coiling in this type of antenna. However, this is not sufficient to achieve the objective of preserving a relatively low bandwidth and nonetheless correct radio quality of the antenna.

Figure 2:
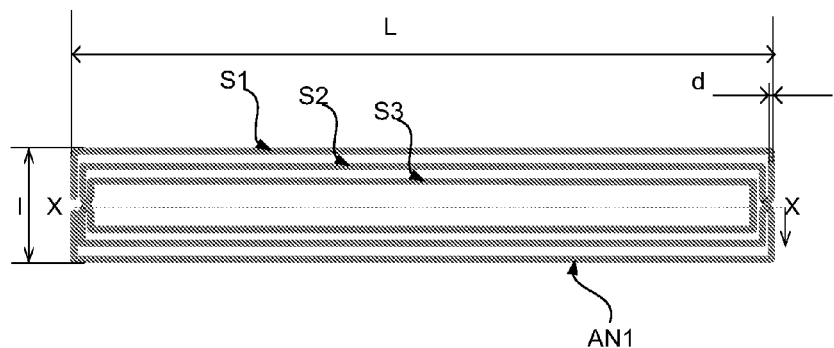
FIG. 2 represents a diagram of the antenna of the portable object according to one embodiment of the invention.

The antenna described in FIG. 2 solves these problems.

FIG. 2 represents an antenna viewed from above for a portable object of bracelet type according to one embodiment of the invention.

By virtue of the antenna according to the invention, one succeeds in retaining a "reasonable" bandwidth, that is to say which is not very high, in such a way as to limit the power radiated or received by the antenna. The antenna according to this embodiment provides the following three properties simultaneously:

it is adapted to match the shape of a bracelet to be worn on the wrist of the user;

it offers a relatively low resistance, and therefore bandwidth, with the aim of limiting the power of the emitted or received signal (while retaining a correct signal-to-noise ratio);

it is mechanically flexible.

Each of these properties will now be discussed.

Shape of the Bracelet

The antenna of FIG. 2 exhibits two axes of symmetry: a longitudinal axis XX and a transverse axis YY perpendicular to XX.

In order to be best integrated into the bracelet of the portable object, the antenna is designed "length-wise" that is to say that its length L along the axis XX is considerably greater than its width 1 along the axis YY, which is relatively small since the bracelet must not be too wide, which would present manipulation and esthetics drawbacks for the wearer. According to a preferred embodiment, we shall take l=10 millimeters (reasonable width for a bracelet worn on the wrist) and L=100 millimeters; the average circumference of the wrist of an adult is about 16 cm, a length of 10 cm therefore substantially covers the wrist, that is to say more than half the average circumference of the wrist of an adult.

Electrical Properties, Resistance

The antenna conventionally takes the form of a wire constituting several coiled turns. By turn is meant here a coiling element which makes a complete revolution around the axis XX of the antenna. As is well known to the person skilled in the art, in the domain of frequencies of NFC (High Frequencies, HF), the resistance of the antenna is not equal only to the resistance of the wire constituting the coiling. It depends also on the material of which the antenna is made and on its dimensional characteristics, especially on the width of the turns. The inventors have noted that the following dimensions are perfectly suitable for the sought-after use:

three turns a width of turns of 0.5 mm an inter-turn width of 0.5 mm a length of 10 cm a width of 1 cm It will be noted that The width of the antenna is imposed by the width of the bracelet.

The length of the antenna is adapted to the length of the bracelet and to the average circumference of the wrist of a user, so as to be able to be wound around the wrist.

The other characteristics are derived experimentally from these imposed dimensions.

According to a preferred embodiment, the antenna is at least partially covered with plastoferrite.

The plastoferrite, glued or fixed by any other means on the side of the antenna which faces the wrist of the user, exhibits here a double advantage:

conventionally, it immunizes on this side the environment from magnetic emissions (in contradistinction to metal which would cause the antenna to lose its characteristics on account of the eddy currents engendered); stated otherwise, the "hidden face" of the antenna is protected from possible disturbances which may occur on the "active" side of the antenna (the side which is presented to the reader);

it isolates the wearer's wrist from electromagnetic radiations originating from the antennas.

According to a preferred embodiment, the antenna comprises three turns, each turn has a width of 0.5 mm, and the separation distance between the turns (S1, S2, S3) is equal to 0.5 millimeters.

Mechanical Properties, Flexibility

At rest, as represented in FIG. 2, the antenna lies flat. It is thereafter fixed or glued to the support of the bracelet, according to any method within the scope of the person skilled in the art. When the user wears the bracelet on their wrist, the bracelet is wound and drags the antenna in this winding around the ace YY, as presented in FIG. 3.

Figure 3:
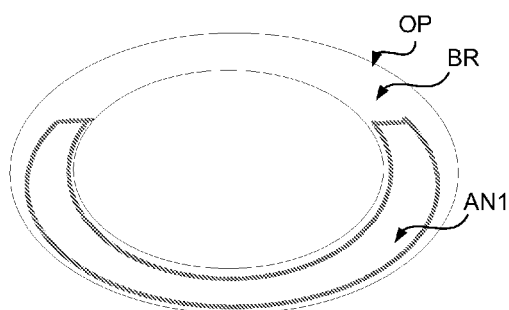
FIG. 3 represents a schematic view of the portable object according to one embodiment of the invention.

FIG. 3 schematically represents the antenna inserted into the bracelet according to one embodiment of the invention. The antenna is viewed side-on (in a plane perpendicular to that of the user's wrist). The antenna extends substantially along the bracelet-shaped support, in such a way that it is able to receive the incident magnetic field whatever the orientation of the portable object in space.

It will be noted that the antenna, on account of its dimensions and its flexibility, adapts naturally to the dimensions of the user's wrist.

Figures 4A, 4B:
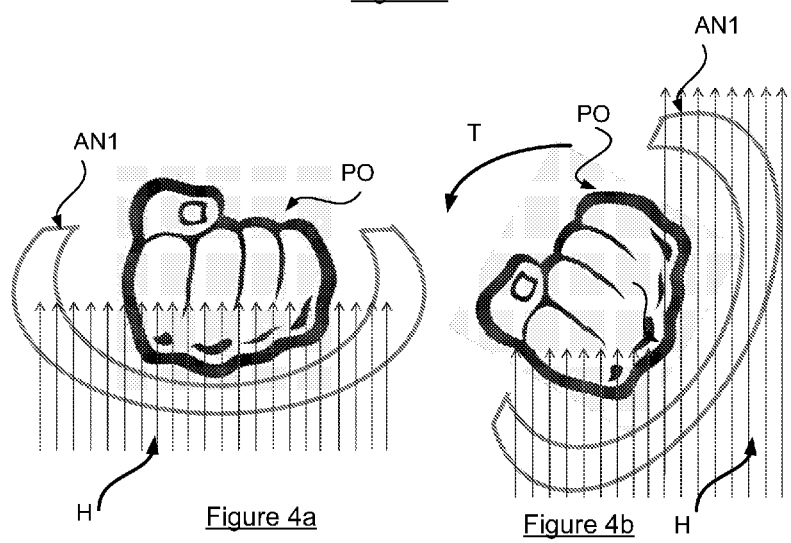
FIG. 4a represents a schematic view of the reception of the magnetic field by the antenna when the object is carried or worn according to a first orientation of the wrist of a user.
FIG. 4b represents a schematic view of the reception of the magnetic field by the antenna when the object is carried or worn according to a second orientation of the wrist of a user.

FIG. 4a represents a schematic view of the reception of the magnetic field by the antenna of FIG. 3 when the object is carried or worn in a first orientation on the user's wrist (the user's wrist (PO) is substantially perpendicular to the plane of the figure, the palm of the hand upwards, and the bracelet is wound around the wrist). The wearer presents their bracelet, and therefore the antenna, in such a way that the magnetic field H, represented by the vertical arrows, is substantially perpendicular to the longitudinal axis XX of the antenna. The antenna is immersed in the magnetic field.

FIG. 4b represents a schematic view of the reception of the magnetic field by the antenna when the object is carried or worn in a second orientation of the user's wrist (the user's wrist is still substantially perpendicular to the plane of the figure but the wrist has rotated in a backward—trigonometric sense, as represented schematically by the arrow T). The wearer presents their bracelet, and therefore the antenna, in such a way that the magnetic field H is no longer perpendicular to the longitudinal axis XX of the antenna. Nonetheless, the antenna remains immersed in the magnetic field, and therefore communication is possible between the object and the reader.

It will be noted additionally that the average power of the incident field remains comparable to that of FIG. 4a (the force lines represented by the vertical arrows are representative of the amplitude of the incident field).

FIGS. 4a and 4b thus illustrate an essential property of the antenna of the bracelet, related to its shape and to its dimensions: whatever the orientation of the user's wrist, or stated otherwise the way in which they present the bracelet to the NFC reader (2) when they approach it, the antenna remains immersed in the incident magnetic field and communication can therefore be established.

An antenna which exhibits the three properties simultaneously sought for a portable object according to the invention—appropriate dimensions for a bracelet, flexibility, low resistance—has been described with the aid of FIGS. 2 to 4.

Such an antenna, integrated into a very simple portable object of bracelet type, devoid of the least energy supply, makes it possible to carry out contactless transactions under very good conditions.

It goes without saying that the embodiment which has been described hereinabove has been given purely by way of wholly nonlimiting indication, and that numerous modifications may easily be made by the person skilled in the art without, however, departing from the scope of the invention.

The invention claimed is:

1. A portable object for near-field communication with an external reader able to provide a magnetic field, the object comprising:
    a near-field communication module comprising at least one antenna and a microcontroller for managing near-field communication; and
    a bracelet-shaped support for receiving the antenna;
    the object being devoid of internal electrical energy supply and of energy storage;
    the antenna being formed of a plurality of turns extending substantially along the bracelet-shaped support, defining a longitudinal central axis, comprising a total length of said antenna along the longitudinal central axis;
    the length of the antenna being more than half the length of the support
    so that, when the object is in the incident magnetic field, the antenna, being wound along the support, is at least partially exposed to the field, whatever the orientation of the object in space; and
    the antenna being fixed to the bracelet-shaped support in a removable manner.

2. The object as claimed in claim 1, the antenna furthermore being formed of a plurality of turns defining a width of said antenna perpendicularly to the longitudinal central axis, wherein the length, the width, a number and dimensions of the turns are calculated so as to constrain the electrical resistance formed by the antenna.

3. The object as claimed in claim 2, wherein the width of the antenna is chosen substantially equal to a width of the support.

4. The object as claimed in claim 2, wherein a width of the turns is equal to an inter-turn distance.

5. The object as claimed in claim 2, wherein the length of the antenna is 10 cm, and the width is 1 cm.

6. The portable object as claimed in claim 1, the antenna comprising an interior face facing a user's wrist when the object is carried or worn by the user, wherein the antenna is overlaid with plastoferrite on said interior face.

7. The portable object as claimed in claim 1, the length of the antenna being less than the length of the support.

8. The portable object as claimed in claim 1, the antenna comprising:
    three turns,
    a width of turns of 0.5 mm, and
    an inter-turn width of 0.5 mm.

9. The portable object as claimed in claim 1, the bracelet-shaped support being a ring adapted to be wound around a finger.

10. The antenna as claimed in claim 1, the length of the antenna being less than the length of the support.

11. The antenna as claimed in claim 1, the antenna comprising:
    three turns,
    a width of turns of 0.5 mm, and
    an inter-turn width of 0.5 mm.

12. An antenna for a portable object, for near-field communication with an external reader able to provide a magnetic field, the portable object having a bracelet-shaped support, wherein the antenna comprises:
    a plurality of turns constituting a coiling having a length, and forming a near-field communication module with a microcontroller on the portable object,
    wherein the antenna extends substantially along the bracelet-shaped support, defining a longitudinal central axis, comprising a total length of said antenna along the longitudinal central axis;
    wherein the length of the antenna is more than half the length of the support
    so that, when the support is in the incident magnetic field, the antenna, being wound along the support, is at least partially exposed to the field, whatever the orientation of the portable object in space,
    the antenna being devoid of an electrical energy supply and energy storage from the portable object and being fixed to the bracelet-shaped support in a removable manner.

13. The antenna as claimed in claim 12, the bracelet-shaped support being a ring adapted to be wound around a finger.

14. The antenna as claimed in claim 12, the antenna furthermore being formed of a plurality of turns defining a width of said antenna perpendicularly to the longitudinal central axis, wherein the length, the width, a number and dimensions of the turns are calculated so as to constrain the electrical resistance formed by the antenna.

15. The antenna as claimed in claim 12, wherein the width of the antenna is chosen substantially equal to a width of the support.

16. The antenna as claimed in claim 12, wherein a width of the turns is equal to an inter-turn distance.

17. The antenna as claimed in claim 12, wherein the length of the antenna is 10 cm, and the width is 1 cm.

18. The antenna as claimed in claim 12, the antenna comprising an interior face facing a user's wrist when the object is carried or worn by the user, wherein the antenna is overlaid with plastoferrite on said interior face.

* * * * *